United States Patent [19]

Doto

[11] Patent Number: 4,765,806
[45] Date of Patent: Aug. 23, 1988

[54] CONTROL METHOD FOR A DUAL-CYLINDER MOISTURE REMOVAL APPARATUS

[75] Inventor: Shigeaki Doto, Kobe, Japan

[73] Assignee: Nippon Air Brake Co., Ltd., Kobe, Japan

[21] Appl. No.: 100,500

[22] Filed: Sep. 24, 1987

[30] Foreign Application Priority Data

Sep. 30, 1986 [JP] Japan .................... 61-234044

[51] Int. Cl.⁴ .............................. B01D 53/04
[52] U.S. Cl. .............................. 55/21; 55/33; 55/162; 55/163
[58] Field of Search .............. 55/21, 33, 62, 162, 55/163

[56] References Cited

U.S. PATENT DOCUMENTS

| | | | |
|---|---|---|---|
| 3,568,406 | 3/1971 | Dynes | 55/33 |
| 3,659,399 | 5/1972 | Kauer, Jr. et al. | 55/33 |
| 3,778,967 | 12/1973 | Kauer, Jr. et al. | 55/21 |
| 3,923,479 | 12/1975 | Glass et al. | 55/33 X |
| 4,549,888 | 10/1985 | Fannin | 55/163 |
| 4,685,941 | 8/1987 | Sato | 55/21 X |

*Primary Examiner*—Kathleen J. Prunner
*Attorney, Agent, or Firm*—J. O. Ray

[57] ABSTRACT

A control method for a dual-cylinder moisture removal apparatus of a pneumatic system is taught. The control method places a limitation on the time for drying of moist air in a drying cylinder. The drying of moist air in one drying cylinder and the regeneration of the absorbent used to dry moist air in a second cylinder are alternated at each predetermined time. When the air compressor is stopped each drying cylinder is switched to a reverse position to the position it occupied just prior to the stopping of the air compressor. Furthermore, when the air compressor resumes operation, the position of each drying cylinder is maintained in the position it occupied just before resumption of operation of the air compressor.

8 Claims, 2 Drawing Sheets

CONTROL METHOD FOR A DUAL-CYLINDER MOISTURE REMOVAL APPARATUS

FIELD OF THE INVENTION

The present invention relates, in general, to moisture removal equipment for pneumatic systems and, more particularly, this invention relates to a method of operating a two-cylinder type moisture removal apparatus.

BACKGROUND OF THE INVENTION

Equipment of this type is used, for example, in the pneumatic brake system of a railroad car. The prior art includes moisture removal devices such as those described in Japanese Utility Model Applications Nos. 55-23621 and 59-86231 in addition to Japanese Patent No. 53-34664, which will be explained in some detail hereinafter with respect to FIGS. 3, 4, and 5 of the drawings. In these Drawings, there is illustrated in FIG. 3 a general two-cylinder type of moisture removal apparatus. As shown therein, an air compressor designated CO and a cooler designated CL are provided. The inlet of the cooler CL is connected in fluid communication with an outlet of the air compressor CO. The outlet of the cooler CL is connected in fluid communication to an inlet of a drain valve designated DV. MV1 and MV2 designate a pair of solenoid valves having their flow inlets connected for fluid communication with the outlet of the drain valve DV. In this system, the solenoid valves MV1 and MV2 are switchable type valves. A pair of drying cylinders designated DR1 and DR2 are provided and have their inlet connected for fluid communication with the flow outlets of the solenoid valves MV1 and MV2. Each of the drying cylinders DR1 and DR2 contains an absorbent therein. Check valves designated CV1 and CV2 are connected in fluid communication with the outlets of the drying cylinders DR1 and DR2 in a manner such that the direction of this outlet of the drying cylinder is a reverse direction. Connected to the check valves CV1 and CV2 in parallel are throttle valves designated NV1 and NV2. SR designates a regenerated air reservoir connected to the throttle valves NV1 and NV2 and to the check valves CV1 and CV2. A second air reservoir designated MR is connected for fluid communication with the regenerated air reservoir SR through a check valve designated CV3. The check valve CV3 is connected such that the direction of the regenerated air reservoir SR is the reverse direction. Also provided is a governor designated GO for the air reservoir MR. The governor GO detects the pressure regulation upper limit value P2 and the lower limit value P1 (FIG. 5). In addition, the governor GO controls the air compressor CO and the drain valve DV. In this equipment, the solenoid valves MV1 and MV2 include an exhaust position designated (b) in which the flow outlet is opened to the atmosphere and the flow inlet is closed. This arrangement occurs when the apparatus is not energized or is off. Further, the solenoid valves MV1 and MV2 include a feed position designated (a) in which the exhaust outlet is closed and the flow inlet is connected to the flow outlet when the apparatus is energized or on.

When the solenoid valve MV1 is ON and the solenoid valve MV2 is OFF, the moist air from the air compressor CO is communicated to the drying cylinder DR1 through the cooler CL, the drain valve DV and the feed position (a) of the solenoid valve MV1. The moist air is dried by the absorbent in the drying cylinder DR1 and is then communicated to the regenerated air reservoir SR via the check valve CV1 and is thereafter communicated to the air reservoir MR via the check valve CV3. During this time, a portion of the dried air passing through the check valve CV1 is directed and flows in the reverse direction to the inlet from the outlet of the other drying cylinder DR2, through the throttle valve NV2, where it regenerates the absorbent in the drying cylinder DR2. During this regeneration of the absorbent in the drying cylinder DR2 the air becomes moist and is then exhausted from the system through the exhaust position (b) of the solenoid valve MV2. Now when the solenoid valve MV1 is switched to the OFF position and the solenoid valve MV2 is switched to the ON position, in reverse to the sequence described in detail above, the moist air is dried in the other drying cylinder DR2 and at the same time the absorbent is being regenerated in the other drying cylinder DR1. At the time the pressure in the air reservoir MR reaches the pressure regulation upper limit value P2 of the governor GO the air compressor CO is stopped and the drain valve DV opens to drain. Thereafter, when the pressure in the air reservoir MR reaches the pressure regulation lower limit value P1 of the governor GO, the drain valve DV closes thereby stopping draining and the air compressor CO goes into operation.

FIGS. 4 and 5 are graphs which illustrate over time the control process for switching the drying and regeneration of the above-described pair of prior art drying cylinders DR1 and DR2.

In one method of operation, according to the prior art and illustrated in FIG. 4, the solenoid valves MV1 and MV2 are always switched ON and OFF at each predetermined time T as determined by a timer which has not been illustrated in the drawings. In other words, one pair of drying cylinders DR1 and DR2 repeat the drying and regeneration cycles in alternation.

In a second method of operation according to the prior art and illustrated in FIG. 5, from which the table in FIG. 3 of the Japanese Patent No. 53-34664 was prepared, the ON/OFF operation of the governor GO which detects the pressure P in the air reservoir MR is linked to the operation and stopping of the air compressor CO. In this method of operation, when the air compressor CO is stopped, both solenoid valves MV1 and MV2 go off and both drying cylinders DR1 and DR2 are switched to the regeneration status. In this method, when the air compressor CO is operated, the solenoid valves MV1 and MV2 are switched into the reverse status from the previous operating time interval and the drying and regeneration of the absorbent in the drying cylinders DR1 and DR2 can be switched.

One of the principal disadvantages associated with the above-described methods is that the switching mechanism which includes the solenoid valves MV1 and MV2 and their control portions become worn out rather quickly. This condition can cause increased damage to the overall pneumatic system. In particular, the first method repeats the drying and the regeneration of the absorbent in the drying cylinders DR1 and DR2 in alternation during each predetermined time T as controlled by the timer regardless of the operation or inoperation of the air compressor CO. Because it can be switched even though the air compressor CO is stopped, the frequency of switching is increased causing additional wear on the above-described components.

SUMMARY OF THE INVENTION

A method of controlling a two-cylinder type moisture removal apparatus in which moist air from the air compressor is supplied from the inlet to the outlet direction of one drying cylinder of one pair of drying cylinders which contain a moisture absorbent therein, to be dried by such absorbent in the drying cylinder, and a portion of this dried air is communicated back from the outlet to the inlet direction of the other drying cylinder to regenerate the absorbent of the drying cylinder and these drying and regeneration operations are repeated in alternation. According to the present invention, the method of controlling such a two-cylinder type moisture removal apparatus includes the step of establishing a predetermined maximum drying time required in a drying cylinder and the drying and regeneration of this drying cylinder are switched at each predetermined time only when the air compressor has been in continuous operation for longer than the predetermined time. When the air compressor stops the drying cylinder is switched just before the air compressor stops and when the air compressor is in operation the status of the drying cylinder just before the air compressor goes into operation is maintained.

OBJECTS OF THE PRESENT INVENTION

It is therefore one of the primary objects of the present invention to provide a method of controlling a two-cylinder type moisture removal apparatus which will minimize switching between the two cylinders.

Another object of the present invention is to provide a method of controlling a two-cylinder type moisture removal apparatus which will reduce the wear on the components caused by excessive switching.

Still another object of the present invention is to provide a method of controlling a two-cylinder type moisture removal apparatus which maintains the drying capacity of the apparatus even with reduced switching between the two drying cylinders.

The above and various other objects and advantages of the present invention will become more readily apparent to those persons skilled in the pneumatic fluid art from the following more detailed description of the invention when such description is taken in conjunction with the attached drawings and with the appended claims.

BRIEF DESCRIPTION OF THE INVENTION

Figure 1:
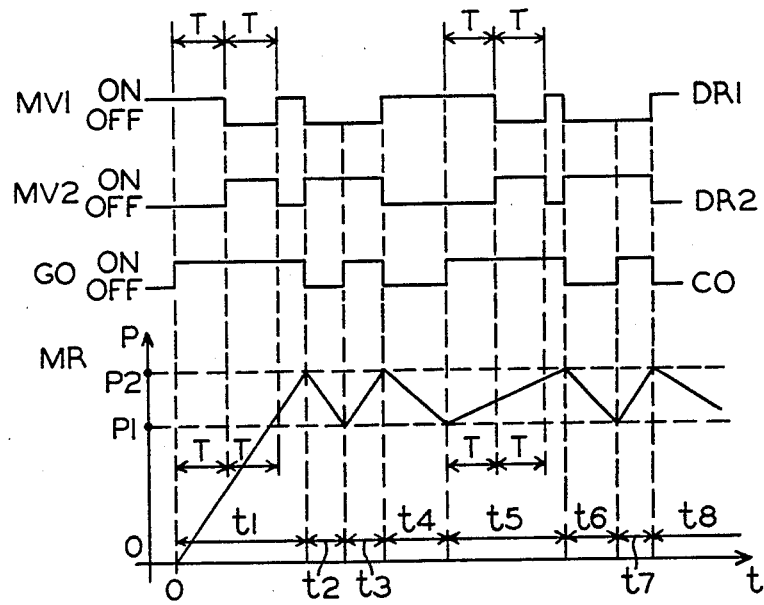
FIG. 1 is a graph which illustrates a presently-preferred embodiment of the moisture removal method according to the present invention.
Figure 2:
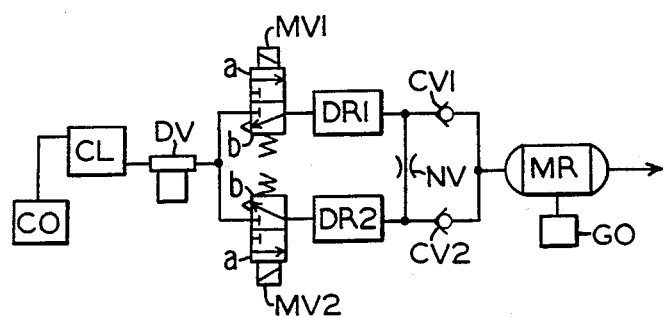
FIG. 2 is a schematic diagram of one apparatus capable of carrying out the control method of the present invention.
Figure 3:
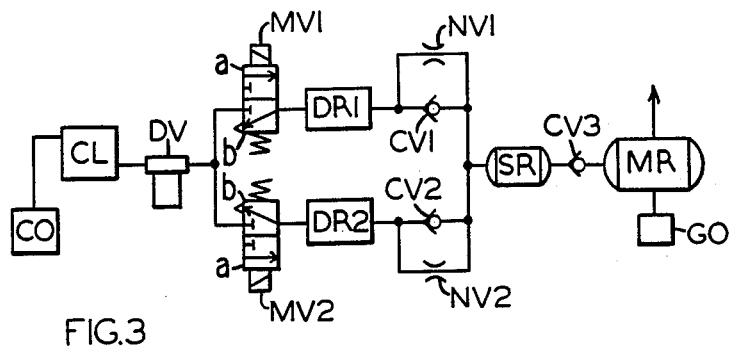
FIG. 3 is a schematic diagram of a prior art two-cylinder type moisture removal apparatus.
Figure 4:
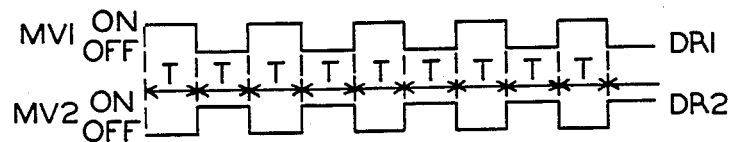
FIG. 4 is a graph which illustrates one prior art control method for a two-cylinder type moisture removal apparatus.
Figure 5:
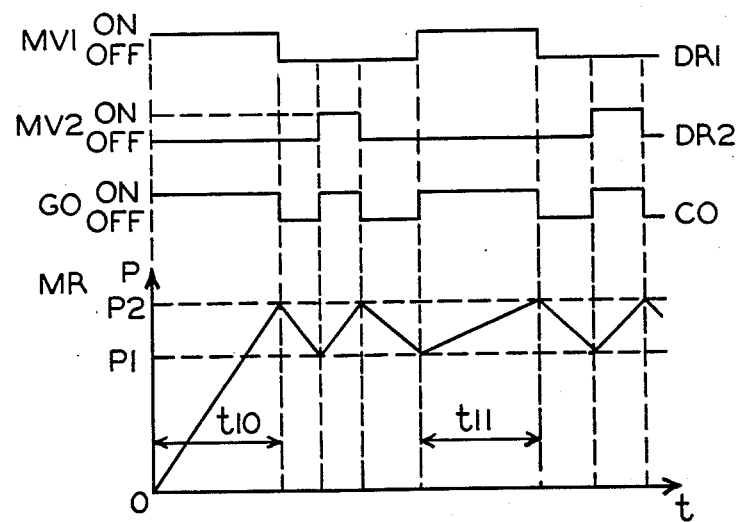
FIG. 5 is a graph which illustrates a second prior art control method for a two-cylinder type moisture removal apparatus.

Now refer more particularly to FIGS. 1 and 2 for an understanding of a presently-preferred embodiment of the control method of a two-cylinder type moisture removal apparatus. It should be noted that the two-cylinder type moisture removal apparatus which is illustrated schematically in FIG. 2 is almost the same as that illustrated in FIG. 3. For this reason, the detailed explanation of FIG. 2 will be minimized and incorporated as necessary into the description of the presently preferred control method.

Reference is now made to the time graph shown in FIG. 1 which illustrates one example of the operation of the moisture removal equipment shown in FIG. 2. When the electric power supply of an electrical control circuit (not shown in the drawings) is turned ON the solenoid valve MV1 switches to an ON position which means it moves to the feed position (a) and the solenoid valve MV2 remains in an OFF position or in the exhaust position (b). At this particular point in time, the air reservoir MR is usually at atmospheric pressure.

At the time the electrical power supply to the governor GO is turned ON, the governor GO detects the pressure in the air reservoir MR and switches ON. At this point, the air compressor CO begins to operate. The initial drying of the air takes place in the drying cylinder DR1 while a simultaneous regeneration of the absorbent is taking place in drying cylinder DR2. In this condition, when a first predetermined time T has elapsed, the solenoid valve MV1 switches to OFF and assumes the exhaust position (b) and the solenoid valve MV2 substantially simultaneously switches to ON and assumes the feed position (a). Consequently, regeneration of the absorbent now takes place in the drying cylinder DR1 and drying of the air takes place in the drying cylinder DR2. This alternate switching of the drying and regeneration continues at predetermined time intervals until the air compressor is stopped.

When the time T1 has passed and the pressure P in the air reservoir MR reaches the pressure regulation upper limit value P2, the governor GO detects this condition and turns OFF. At this point, the air compressor CO is stopped. In addition, and at the same time, the solenoid valves MV1 and MV2 switch to the positions which are the reverse of their immediately-prior status. In other words, in the embodiment illustrated in FIG. 1, the solenoid valve MV1 switches OFF and moves to the exhaust position (b) and the solenoid valve MV2 switches ON and moves to the feed position (a). Thereafter, when the time T2 has elapsed and the pressure P in the air reservoir MR has been consumed to the point where it reaches the pressure regulation lower limit value P1 the governor GO turns ON and the air compressor CO goes into operation once again. However, at this time, the solenoid valves MV1 and MV2 maintain the positions they had assumed just before the operation of the air compressor, i.e., the drying of the air takes place in the drying cylinder DR1, while the regeneration of the absorbent is taking place in the drying cylinder DR2.

In the embodiment being described, the time T3 is less than the predetermined time T and therefore the drying cylinders DR1 and DR2 both maintain their positions. When this time T3 has elapsed and the governor GO switches OFF and the air compressor CO is again stopped, the solenoid valve MV1 switches ON and moves to the feed position (a) while the solenoid valve MV2 switches OFF and moves to the exhaust position (b) all at the same time.

Time T4, which occurs after the time T3, is longer than the predetermined time T but the solenoid valves MV1 and MV2 are not switched. When time T4 has elapsed, the governor GO turns ON and the air compressor CO goes into operation. However, the solenoid valves MV1 and MV2 at this time maintain their current positions. The time T5 is longer than the predetermined time T so that the solenoid valves MV1 and MV2 are switched after each predetermined time T; in other words, the drying and regeneration of the drying cylinders DR1 and DR2 are switched in alternation.

Furthermore, the operation during times T6, T7, and T8 can easily be understood from the above detailed explanation and from reference to FIG. 1. For that reason, and for the sake of brevity, further detailed explanations will not be presented here.

In the above description of the invention, it should be noted that the solenoid valves MV1 and MV2 are those which will assume an air feed position when energized. However, it should be understood by those skilled in the art that solenoid valves which assume an air feed position when de-energized could also be used.

According to the presently-preferred embodiment of the method of the invention described above, the operation of the air compressor is linked and the timer control is used at the same time. In other words, when the air compressor begins operation after having been stopped, the drying cylinders remain in their respective positions they had just before resumption of air compressor operation and also when the continuous operating time of the air compressor is less than the predetermined time T. Consequently, the switching of the drying and regeneration does not take place thereby eliminating the unnecessary switching which causes excessive wear and damage to the switching mechanism. Moreover, when the air compressor shuts down, the drying and regeneration are switched into the reverse of the position they occupied just before the shutdown of the air compressor. In addition, the drying and regeneration is switched when the operating time is greater than the predetermined time. Such switching occurs each time the operating time exceeds the predetermined time so that a decrease of the drying capacity of the drying cylinder can be prevented and efficient drying becomes possible. It has been discovered that it is not necessary to add extra absorbent when using the method of the present invention.

Therefore, in the presently-preferred embodiment of the invention, when the continuous operating time of the air compressor is less than the predetermined length of time, and when the air compressor initially goes into operation, the switching of the drying and regeneration does not occur thereby eliminating an unnecessary switching process on the equipment. On the other hand, when the compressor switches from operation to shutdown, the drying and regeneration are switched and when the continuous operating time of the air compressor is longer than the predetermined time, the drying and regeneration are switched at the elapse of each predetermined time, thereby preventing any significant decrease in drying capacity when compared to the methods of the prior art.

It can be seen, from the above description, that this invention accomplishes its objectives by providing a method of controlling a two-cylinder type moisture removal apparatus in which the moist air from the air compressor is communicated into the inlet of one drying cylinder, on one pair of drying cylinders, each of which contains an absorbent, to the outlet direction and is dried by the absorbent in the drying cylinder. A portion of this dried air is communicated in the reverse direction from the outlet to the inlet direction of the other drying cylinder to regenerate the absorbent in that drying cylinder, this drying and regeneration step being repeated in alternation. The elimination of the problem associated with the prior art described above is achieved by the control method of the present invention because such control method places a limitation on the time for drying the moist air with an absorbent in a drying cylinder and the drying and regeneration of the absorbent in the drying cylinder are conducted at each predetermined time only when the air compressor has been in continuous operation for a preset length of time. When the air compressor is stopped, the drying cylinder is automatically switched at that time to a reverse position with respect to the position it occupied just prior to the shutdown of such air compressor. In addition, when the air compressor resumes operation once again, the position of the drying cylinders is maintained the same as the position it occupied before resumption of operation of the air compressor occurred.

While a presently-preferred embodiment of a control method for a dual-cylinder moisture removal apparatus in a pneumatic system has been described in detail above, with reference to the drawings, it should be understood by those persons skilled in the pneumatic art, that other modifications and adaptations can be made to the present invention without departure from the spirit and scope of the appended claims.

I claim:

1. A pneumatic system dual-cylinder moisture removal apparatus control method, said control method comprising the steps of:
    (a) establishing a predetermined time which is at least sufficient to substantially dry an absorbent contained in a first drying cylinder, said predetermined time being substantially equal to a time to substantially saturate an absorbent contained in a second drying cylinder with moisture;
    (b) linking operation of an air compressor with a timing device;
    (c) establishing fluid communication of a moist air from a first solenoid valve with an inlet of said second drying cylinder to remove moisture therefrom;
    (d) communicating a first portion of dry air from an outlet of said second drying cylinder to an air reservoir;
    (e) diverting a second portion of said dry air to an outlet of said first drying cylinder;
    (f) communicating said second portion of dry air through said first drying cylinder to regenerate said absorbent;
    (g) exhausting said second portion of air from said first drying cylinder through a second solenoid valve; and
    (h) alternating moisture removal in step (c) and regeneration of absorbent in step (f) only when at least one of said predetermined time established in step (a) has elapsed and when operation of said air compressor is stopped.

2. A control method, according to claim 1, wherein when said air compressor resumes operation said moisture removal in step (h) and said regeneration of absorbent in step (h) remain the same.

3. A control method, according to claim 2, wherein said control method includes the additional step of communicating said second portion of dry air through a throttle positioned between said outlet of said first drying cylinder and said outlet of said second drying cylinder.

4. A control method, according to claim 3, wherein said control method includes the additional steps of detecting an upper and a lower pressure limit value in said air reservoir.

5. A control method, according to claim 4, wherein said control method includes the additional step of controlling starting and stopping of said air compressor based on said limit value detected in said air reservoir.

6. A control method, according to claim 5, wherein said pneumatic system includes a cooler for said moist air and said control method includes the additional step of cooling said moist air prior to step (c).

7. A control method, according to claim 6, wherein said pneumatic system further includes a drain valve and said control method includes the additional step of periodically opening said drain valve.

8. A control method, according to claim 7, wherein said pneumatic system further includes a check valve connected intermediate each drying cylinder and said air reservoir and said control method includes the additional step of preventing communication of air from said air reservoir to said outlet of each of said first and said second drying cylinder.

* * * * *